United States Patent Office 2,709,176
Patented May 24, 1955

2,709,176

CLEAVAGE OF ORGANOHALOGENO-POLYSILANES

Ben A. Bluestein, Schenectady, N. Y., assignor to General Electric Company, a corporation of New York No Drawing. Application March 12, 1954,
Serial No. 415,960

11 Claims. (Cl. 260—448.2)

This invention relates to the treatment of organohalogenopolysilanes and the preparation of organic compounds of silicon, particularly organohalogenomonosilanes. More particularly, this invention is concerned with the method which comprises heating an organohalogenopolysilane containing a silicon-silicon linkage at an elevated temperature in the presence of a tertiary organic amine and a hydrogen halide so as to cleave the silicon-to-silicon bond, thereby to obtain a material of lower molecular weight, and, in particular, an organohalogenomonosilane.

As used herein, the term "organohalogenopolysilane," for instance, an organohalogenodisilane is intended to mean organic compounds containing the unit structure

where Z is an organic radical, and at least one of the silicon atoms in the polysilane chain contains a silicon-bonded halogen atom, e. g., chlorine, bromine, fluorine, etc., the other valences of the silicon atom being satisfied by members selected from the class consisting of hydrogen, an organic radical (e. g., methyl, ethyl, propyl, isopropyl, phenyl, tolyl, xylyl, benzyl, chlorophenyl, chloroxylyl, etc.), halogen (e. g., chlorine, bromine, fluorine, etc.) and another silicon atom. Polysilicon compounds containing a plurality (i. e., at least two) of adjacent silicon atoms are described in Mohler et al. Patent 2,598,435, issued May 27, 1952, and in Burkhard Patent 2,554,976, issued May 29, 1951, both patents being assigned to the same assignee as the present invention.

One of the objects of this invention is to provide a rapid method for degrading organohalogenopolysilanes to organohalogenomonosilanes.

Another object of the invention is to produce alkyl halogenomonosilanes.

A further object of the invention is to produce dimethyldichlorosilane.

A still further object of the invention is to prepare methyldichlorosilane in good yields from less desirable organohalogenopolysilanes.

Further objects of this invention will become apparent as the description thereof proceeds.

Organohalogenopolysilanes, for instance, organohalogenodisilanes, have been shown to be capable of cleavage to monosilanes. However, previous methods for effecting this degradation from the polysilane to the monosilane state have not been satisfactory because, in the first place, the yields of desirable products have been poor, and in the second place, the experimental conditions for this conversion have been difficult to carry out and have required extremely high temperatures and accordingly expensive pressure equipment.

I have now discovered that organohalogenopolysilanes of the type previously described can be readily cleaved to organohalogenomonosilanes, even at relatively mild temperatures, so as to rupture the silicon-to-silicon bond to obtain organosilicon compounds, the molecular weights of which are lower than those of the starting organohalogenopolysilanes. My invention is particularly applicable to the treatment of individual organodisilanes or high boiling fractions comprising a mixture of organodisilanes corresponding to the general formula

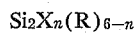

where R is a monovalent hydrocarbon or halogenated, e. g., chlorinated hydrocarbon, radical (for instance, an alkyl, aryl, alkaryl, arylkyl, chlorinated aryl, etc., radical), X is a halogen (for instance, chlorine, bromine, fluorine, etc.) and $n$ is an integer equal to from 1 to 5, inclusive. Such disilane compositions of matter are obtained usually during the passage of hydrocarbon halides over heated silicon, preferably in the presence of a catalyst in accordance with the disclosures and teachings of Rochow Patent 2,380,995 issued August 7, 1945, and assigned to the same assignee as the present invention. In addition to the usual organohalogenomonosilanes obtained, mixtures of organohalogenodisilanes corresponding to the above formula are also obtained, as well as small amounts of organohalogenopolysilanes containing more than two silicon atoms joined to each other by silicon-silicon linkages.

A more specific type of high boiling residue consisting for the most part of methylchlorodisilanes (obtained by the passage of methyl chloride over silicon and copper in accordance with the above-mentioned Rochow patent) comprises compositions having the general formula

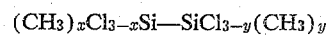

where $x$ is a whole number equal to from 0 to 3, and $y$ is a whole number equal to from 0 to 3. As a result of the reaction between methyl chloride and silicon described above, about 70 to 85% of the product other than the monosilanes and materials boiling below dimethyldichlorosilane comprise the above-described methylchlorodisilanes, the remainder of the high boiling residue being a mixture of methylchlorosiloxanes and silmethylene compounds having the unit

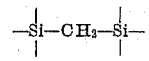

Although these organohalogenopolysilanes have some uses, for instance, as priming agents for the purpose disclosed in Smith-Johannsen Patent 2,575,141, or as minor modifying agents in the manufacture of silicone oils and resins, their utility is limited. Accordingly, it has been desirable to find a method for a ready degradation of these organohalogenopolysilanes to more useful organohalogenomonosilanes, for instance, methyltrichlorosilane, dimethyldichlorosilane, methyldichlorosilane, trimethylchlorosilane, and even inorganic halogenosilanes, for instance, silicon tetrachloride.

All the above objects and the desirable results recited above can now be accomplished by treating the above organohalogenopolysilane or mixture of organohalogenopolysilanes with a mixture comprising a tertiary organic amine or suitable salt thereof and a hydrogen halide, preferably a hydrogen halide whose halogen is the same as the halogen of the organohalogenopolysilane. The fact that this reaction could be caused to proceed so readily at moderate temperatures of the order of about 75–150° C. was entirely unexpected and in no way could have been predicted because, in the past, much higher temperatures of the order of about 300–600° C. were usually required in the absence of catalysts to effect the desired conversion of the organohalogenopolysilanes to organohalogenomonosilanes.

The mechanism whereby it is possible to obtain organohalogenomonosilanes, particularly monosilanes of this type containing silicon-bonded hydrogen, from organohalogenopolysilanes is not clearly understood. However, it is believed that the cleavage of silicon-silicon bonds is accomplished primarily as a result of the catalytic action of the tertiary amine and secondarily from the concurrent presence of the hydrogen halide and the tertiary amine. In addition, the hydrogen halide is a reactant dissociating under the reaction conditions to saturate unsatisfied valences of the formed organohalogenomonosilanes with either hydrogen or halogen, or both hydrogen and halogen, thus accounting for the production of the organo-silicon hydrides in the reaction product. As pointed out previously, the use of a salt of the organic tertiary amine, namely, the amine-hydrogen halide [e. g., tri-(n-butyl) amine hydrochloride] may be employed alone with the organohalogenopolysilane. However, this may be impractical since it requires unduly large amounts of the amine-hydrogen halide salt. Accordingly, for most practical utilization of my invention, it is advantageous to employ the organic tertiary amine as a catalytic agent for cleavage purposes and to introduce the hydrogen halide as a separate reactant into the reaction zone containing the organohalogenopolysilane and the organic tertiary amine.

Among the hydrogen halides which may be used in the practice of the invention are, for instance, hydrogen chloride, hydrogen bromide, hydrogen fluoride, etc. Generally, it is desirable that the hydrogen halide be employed in the gaseous state, although the use of the hydrogen halide in the liquid state under pressure is not precluded.

The tertiary organic amines useful in the practice of the present invention are any of those which are readily available including tertiary amines in which all three of the valences of the nitrogen are satisfied by organic radicals; heterocyclic tertiary organic amines having a double bond of unsaturation as, for instance, that present in compounds such as pyridine, quinoline, etc., which contain the

grouping. Among the tertiary organic amines which I have found to be useful in the practice of the present invention may be mentioned, for example, triaryl amines, such as triphenyl amine, tribenzyl amine, etc.; trialkyl amines having the formula $$R_3N$$

where R may be the same or different alkyl radicals (e. g., for instance, methyl, ethyl, propyl, butyl, isobutyl, octyl, etc.); N-dimethyl aniline, N-methyl morpholine, pyridine, quinoline, N-ethylpiperidine, lauryl dimethylamine, N,N-dimethyl benzylamine, tri-(n-butyl amine), triethyl amine, trimethyl amine, isoquinoline; the various picolines, e. g., α-picoline; N-methylpiperidine, etc.

Included within the tertiary organic amines effective in the practice of my invention are salts of tertiary organic amines (many examples of which amines are disclosed above) with organic and inorganic acids such as, for instance hydrogen chloride, sulfuric acid, acetic acid, propionic acid, benzoic acid, etc. Thus, my invention may be carried out by introducing a hydrogen halide into a mixture of ingredients comprising the above-described organohalogenopolysilanes (or mixture of organohalogenopolysilanes) and the above-mentioned salt of the tertiary amine, for example, trimethylamine hydrochloride, tributylamine hydrochloride, triethylamine sulphate [having the formula

tributylamine acetate, trimethylamine benzoate, etc. Under the conditions of the reaction, it is believed that these salts dissociate sufficiently to release catalytic amounts of the tertiary organic amine sufficient for successfully carrying out the above-described reaction.

In order to refer more readily to these tertiary organic amines or salts thereof, the term "organic amine compound" will hereinafter be referred to in the description of the invention and in the claims to cover both the tertiary organic amine itself as well as the salts with the hydrogen halide prepared therefrom. Preferably, the organic tertiary amine alone rather than the salt thereof, is employed in the reaction mixture during introduction of the hydrogen halide, in order to control better the amounts of hydrogen halide required to effect the desired interaction with the organohalogenopolysilanes and the tertiary amine.

I have also found that the cleavage reaction can be caused to take place by employing solely sufficient amounts of the hydrogen halide salts of the tertiary organic amines described above, without further addition of hydrogen halide to the reaction mixture. Thus, for example, the salt formed from hydrogen chloride and tributylamine, namely, tributyl ammonium chloride having the formula

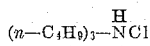

is quite effective in causing the desired cleavage of the organohalogenopolysilanes to the organohalogenomonosilanes without addition of hydrogen chloride. However, in order to obtain sufficient hydrogen chloride for the reaction, it is essential that large amounts of the salt capable of releasing the requisite amount of hydrogen chloride, be employed for the purpose. This is usually not practicable and poses control problems in insuring that adequate amounts of hydrogen halide are available for the reaction. This, of necessity, would require large amounts of preformed tertiary triorgano-ammonium halides required for carrying out the reaction.

The reaction is advantageously conducted in either the vapor phase or liquid phase at elevated temperatures sufficiently high to effect rupturing of the Si—Si bond but below the decomposition point of the formed monosilanes. Good results are obtained when temperatures of the order of about 75° to 200° C. or higher are employed.

One preferred method for carrying out the reaction comprises heating a mixture of a tertiary organic compound (e. g., a tertiary organic amine) and the organohalogenopolysilane (or mixture of organohalogenopolysilanes) to the boiling point of the mixture, which in the case of a mixture of methylchloropolysilanes such as the methylchlorodisilanes described above may be around 100° to 150° C., and simultaneously introducing the hydrogen halide into the mixture in the form of a gas or vapor while maintaining the elevated temperatures originally present. It will be noted that the vapor temperature will fall as the monosilanes are formed and removed from the reaction mixture.

The amount of organic amine compound, e. g., tertiary organic amine, employed in the reaction is not critical and may be varied widely, depending upon such factors as the type of organohalogenopolysilane employed, the rate at which it is desired to remove the organohalogenomonosilanes, the temperature at which the reaction is carried out, etc. Generally, on a weight basis, I may use at least 0.1%, e. g., from 0.5% to 100%, by weight, or more of the tertiary organic compound, based on the weight of the organohalogenopolysilane. Referring specifically to the above mixture of methylchlorodisilanes, on a molar basis, the organic amine compound may comprise from about 0.001 to 4 or 5 moles of the latter per mole of the disilane mixture.

The amount of hydrogen halide employed in the reaction also may be varied widely and will depend upon such factors as the type of organohalogenopolysilane, the type of tertiary organic compound employed, the concentration of the latter amine, temperature of the reaction, etc. On a molar basis, one may advantageously use at least 0.25 mole, and preferably at least 1 to 1.5 moles, of the hydrogen halide per mole of the organohalogenopolysilane. Obviously, more than 1.5 moles hydrogen halide per mole organopolysilane may be employed but this is usually not necessary for optimum results, since excess amounts pose handling and recovering problems. Obviously, excess hydrogen halide can be recycled to the reaction mixture, if desired. The concentration of the organic tertiary compound and the hydrogen halide should be of sufficient amount in the reaction zone so as to effect the desired conversion of the organohalogenopolysilanes to the organohalogenomonosilanes at a satisfactory rate.

In order that those skilled in the art may better understand how the present invention may be practiced, the following examples are given by way of illustration and not by way of limitation. All parts are by weight.

In all the following examples, the organohalogenopolysilane employed consisted of a mixture of methylchloropolysilanes obtained by passing methyl chloride over heated silicon in the presence of a copper catalyst in the manner disclosed in the aforementioned Rochow patent to give a fraction comprised essentially of a mixture of compounds embraced by the aforementioned formula

$$Si_2X_n(R)_{6-n}$$

where R is a methyl group and $n$ is an integer equal to from 0 to 6. This mixture of compounds comprises a high boiling fraction (the bulk of it boiling from about 125° to 175° C.), and is composed for the most part of large amounts of dimethyl tetrachlorodisilane (including its various isomers, such as, for instance, 1,1-dimethyl-1,2,2,2-tetrachlorodisilane and 1,2-dimethyl-1,1,2,2-tetrachlorodisilane) and trimethyl trichlorodisilane (including its various isomers), as well as small amounts of methyl pentachlorodisilane and tetramethyldichlorodisilane (including its isomers). Also present in the mixture of methylchlorodisilanes are small amounts of methylchloromonosilanes, methyldisiloxanes, and methyl-substituted disilylalkylene, e. g., disilylmethylene compounds. However, about 70 to 80% of this high boiling residue comprises a mixture of methylchlorodisilanes, as well as small amounts of hexachlorodisilane. For purposes of brevity, this methylchlorodisilane mixture will hereinafter be referred to as "mixture of methylchlorodisilanes."

EXAMPLE 1

Into a reaction vessel containing 60 grams (0.3 mole) tri(n-butyl) amine was introduced sufficient gaseous hydrogen chloride so as to precipitate solid tributylammonium chloride. It was calculated that 3 grams (0.08 mole) of hydrogen chloride were absorbed. To this solid salt was added 20 ml. (about 0.1 mole) of the mixture of chlorodisilanes described above which had been prestripped to about 89° C. The mixture of ingredients was then simultaneously heated so as to remove 14 grams of a volatile liquid mixture boiling below 70° C. Analysis of the volatile mixture showed that of the methylchloromonosilanes, there was present a weight ratio of 9 parts methyldichlorosilane, 10 parts dimethyldichlorosilane, and 16 parts methyltrichlorosilane. Small amounts of trimethylchlorosilane, silicon tetrachloride, and dimethylchlorosilane were also present.

EXAMPLE 2

In this example a mixture of about 40 grams (0.21 mole) tributylamine and 110 grams of the mixture of methylchlorodisilanes described above was heated to about 140° C. to 150° C., and while at this temperature, gaseous hydrogen chloride was passed into the mixture for about 1 hour. The vapor temperature dropped as the monosilanes were formed and removed. There was thus obtained a total of 94 grams of product, of which, by weight, 36% was a mixture of methyldichlorosilane and trimethylchlorosilane, and 49% was a mixture of dimethyldichlorosilane and methyltrichlorosilane in a weight ratio of 2 to 3.

EXAMPLE 3

In this example, various tertiary organic amines were employed as catalysts in the same manner as described in the foregoing two examples for cleaving the mixture of methylchlorodisilanes. In carrying out this series of reactions, a 500 ml. flask was used as the reaction zone. This flask in turn was connected to a fractionating column and a series of condensers capable of effecting satisfactory fractionation of the various ingredients in the reaction product. The condensers were followed by various traps to catch the low boiling materials. Drying tubes were utilized throughout the system in order to maintain substantially anhydrous conditions for the reaction. In general, the procedure for carrying out the reaction was the same as that described in Example 2. The molar ratio of the mixture of the methylchlorodisilane and the amines was of the order of about 0.5 mole of the former to 0.25 mole of the amine used. In general, the procedure comprised continuously passing gaseous hydrogen chloride into the mixture of methylchlorodisilanes and the particular tertiary organic amine in the flask while heating the latter to the boiling point of the mass which usually ranged from about 90° to 150° C., and simultaneously distilling out from the flask the methylchloromonosilanes as well as other reaction products including unreacted methylchlorodisilanes and hydrogen chloride. The following Table I shows the results of these individual runs, the hydrogen chloride being introduced at the rate of about 0.4 mole per hour until all the polysilane in the reaction vessel had reacted. Table I shows the percentage of the methylchloromonosilanes present in the distillate containing the mixture of monosilanes.

*Table I*

| Run No. | Amine Used | Percent [1] Yield of Distillate | Percent $(CH_3)_2SiCl_2$ | Percent $(CH_3)HSiCl_2$ | Percent $(CH_3)_3SiCl$ | Percent $CH_3SiCl_3$ |
|---|---|---|---|---|---|---|
| 1 | N,N-dimethylaniline | 68.7 | 28.1 | 31.1 | 2.1 | 38.5 |
| 2 | Pyridine | 26.8 | | 10.0 | | |
| 3 | Lauryldimethylamine | 90.8 | | 31.0 | 3.5 | 32.7 |
| 4 | N,N-dimethylbenzylamine | 56.4 | 41.2 | 24.6 | 4.1 | 30.0 |
| 5 | Quinoline | 62.2 | 39.7 | 12.5 | 4.1 | 41.1 |
| 6 | No amine | 0 | No reaction | No reaction | No reaction | No reaction |

[1] Weight percent of distillate to original methylchlorosilane mixture.

EXAMPLE 4

This example illustrates the effect of varying the concentration of the organic amine, specifically tri(n-butyl) amine. In each of the three runs described below, the same reaction equipment and procedures were employed as in Example 3. However, the amount of the trialkylamine was varied over a fairly wide range. In each instance, there was employed 0.5 mole of the mixture of methylchlorodisilanes described in Example 1. The requisite amount of tri(n-butyl) amine was added to the mixture of methylchlorodisilanes and heated to about 100° to 110° C. and thereafter gaseous hydrogen chloride was passed into the reaction mixture at the rate of about 0.4 mole per hour. The addition of the hydrogen chloride took place over a period of about three hours. The following Table II shows the results of these three runs. The designation "Percent yield of distillate" and percents of monosilanes recited in the table are on the same basis as in Table I.

ment to effect interaction and distillation of the reaction products. Distillate was collected at a vapor temperature of between 40° to 80° C. and reaction was continued as long as an appreciable quantity of distillate was obtained in this range, generally for about 3 to 6 hours. The following Table III shows the particular catalyst used in each instance, the concentration of the tertiary organic amine compound, the solvent, if any, employed, the temperature of reaction, and the hydrogen chloride rate in the form of moles per hour. Under the heading "Catalyst concentration," and designation "20 mole percent" of tri(n-butyl) amine is intended to mean that 23.7 ml.

Table II

| Run No. | Moles Tri(n-butyl) Amine | Percent Yield of Distillate | Percent $(CH_3)_2SiCl_2$ | Percent $(CH_3)HSiCl_2$ | Percent $(CH_3)_3SiCl$ | Percent $CH_3SiCl_3$ |
|---|---|---|---|---|---|---|
| 7 | 0.008 | 89.6 | 19.0 | 37.7 | 2.8 | 40.3 |
| 8 | 0.034 | 88.4 | 20.1 | 34.5 | 2.9 | 42.2 |
| 9 | 0.25 | 86.6 | 19.0 | 35.7 | 2.8 | 42.4 |

If desired, after most of the mixture of methylchlorodisilanes has been caused to react with the hydrogen chloride in the presence of the tertiary amine, additional amounts of methylchlorodisilanes may be added to the residue and HCl again passed through the mixture to give essentially the same yield of distillate with approximately the same ratio of reaction products. Thus, it was found that after repeating the reaction between the mixture of methylchlorodisilanes (0.5 mole) with 0.034 mole tri(n-butyl) amine to give a yield of 88.4% distillate of which about 34.5% was methyldichlorosilane, 20.1% was dimethyldichlorosilane, 2.9% was trimethylchlorosilane, and 42.2% was methyltrichlorosilane, when an additional 0.5 mole of the mixture of methylchlorodisilanes was added to the residue and HCl again passed through the heated mixture (90° to 100° C.), the new yield of distillate was 93.2%, while the methyldichlorosilane was equal to 33.5%, the dimethyldichlorosilane was equal to 21.1%, the $(CH_3)_3SiCl$ equalled 3.2% and the $CH_3SiCl_3$ equalled 41.9%.

In all the foregoing examples, there was also obtained as a result of the reaction of the mixture of methylchlorodisilanes and hydrogen chloride in the presence of the organic tertiary amine, small amounts of other chlorosilanes such as silicon tetrachloride, silicochloroform, etc.

EXAMPLE 5

This example illustrates the effect of carrying out a series of runs in which catalyst, catalyst concentration, temperature, and rate of addition of the hydrogen chloride were varied over a fairly wide range. In addition, some of the examples below employ solvents. In each case, the reaction was carried out in a 500 ml. flask connected to a fractionating column, packed with ⅛" glass helices and to a series of condensers. The gaseous hydrogen chloride was introduced beneath the surface of the liquid methylchlorodisilane in the flask. The apparatus had a sufficient number of condensers (usually cooled by Dry Ice) to trap the extremely low boiling volatile materials. In each instance, 110 grams of the mixture of methylchlorodisilanes previously employed (prestripped to 90° C. to remove all volatiles boiling up to this temperature) were placed in the reaction vessel and the amine was thereafter added. To this mixture was added a solvent, if any, and the mixture of ingredients heated to a specified temperature. The addition of hydrogen chloride was initiated and heating of the reaction mixture maintained at the stipulated temperature throughout the experiof this catalyst were employed and the recitation "2 mole percent" is intended to mean that 2.37 ml. of the tri(n-butyl) amine were employed. With regard to the N,N-dimethylaniline, "20 mole percent" indicates that 12.6 ml. were employed while "2 mole percent" indicates that 1.26 ml. were used. Where stated, the amount of xylene used comprised 150 ml. The HCl designation of 0.2 mole/hour meant that the conditions were under 7 cm. mercury flow meter pressure, while the HCl designation of 0.5 mole/hour meant 16 cm. mercury flowmeter pressure.

Table III

| Run No. | Catalyst | Catalyst Concentration, Mole Percent | Solvent | Temperature, °C. | HCl Rate, Mole/Hr. |
|---|---|---|---|---|---|
| 10 | Tributylamine | 20 | Xylene | 135 | 0.5 |
| 11 | Dimethylaniline | 2 | None | 135 | 0.2 |
| 12 | Tributylamine | 2 | Xylene | 100 | 0.2 |
| 13 | do | 20 | None | 135 | 0.5 |
| 14 | Dimethylaniline | 20 | Xylene | 135 | 0.2 |
| 15 | do | 2 | do | 100 | 0.2 |
| 16 | do | 20 | None | 135 | 0.2 |
| 17 | do | 20 | do | 100 | 0.5 |
| 18 | Tributylamine | 2 | do | 100 | 0.2 |
| 19 | do | 20 | do | 100 | 0.2 |
| 20 | Dimethylaniline | 20 | Xylene | 100 | 0.5 |
| 21 | do | 2 | do | 100 | 0.2 |
| 22 | Tributylamine | 20 | None | 100 | 0.5 |
| 23 | do | 2 | do | 135 | 0.2 |
| 24 | Dimethylaniline | 20 | Xylene | 135 | 0.5 |
| 25 | do | 2 | None | 100 | 0.2 |
| 26 | do | 20 | Xylene | 100 | 0.2 |
| 27 | Tributylamine | 2 | None | 135 | 0.5 |
| 28 | Dimethylaniline | 20 | do | 100 | 0.2 |
| 29 | do | 20 | do | 135 | 0.5 |
| 30 | Tributylamine | 20 | do | 135 | 0.2 |
| 31 | do | 2 | Xylene | 100 | 0.5 |
| 32 | Dimethylaniline | 2 | None | 100 | 0.5 |
| 33 | Tributylamine | 20 | Xylene | 135 | 0.2 |
| 34 | do | 20 | do | 100 | 0.2 |
| 35 | Dimethylaniline | 2 | None | 135 | 0.5 |
| 36 | do | 2 | Xylene | 135 | 0.5 |
| 37 | Tributylamine | 2 | None | 100 | 0.5 |
| 38 | Dimethylaniline | 2 | Xylene | 135 | 0.2 |
| 39 | Tributylamine | 2 | do | 135 | 0.2 |
| 40 | do | 20 | do | 100 | 0.5 |
| 41 | do | 2 | do | 135 | 0.5 |

The following Table IV shows the results of the disilane cleavage while employing the conditions recited above in Table III. This Table IV differs from previous tables showing the results of disilane cleavage in that the per cent yield of distillate is replaced by the actual weight of distillate obtained. In addition, more detailed results of the amount of methyldichlorosilane which is a more desirable product are recited in this Table IV.

Table IV

| Run No. | Grams of Distillate | Percent $(CH_3)_2SiCl_2$ | Grams $CH_3SiHCl_2$ | Percent $CH_3SiHCl_2$ | Percent $(CH_3)_3SiCl$ | Percent $CH_3SiCl_3$ |
|---|---|---|---|---|---|---|
| 10 | 93.7 | 18.72 | 33.6 | 35.94 | 2.49 | 39.40 |
| 11 | 95.8 | 18.79 | 32.9 | 34.39 | 2.35 | 42.28 |
| 12 | 58.7 | 28.08 | 19.0 | 32.29 | 5.28 | 31.00 |
| 13 | 105.7 | 21.73 | 36.0 | 34.03 | 2.80 | 39.77 |
| 14 | 105.2 | 19.50 | 38.9 | 37.05 | 3.08 | 37.05 |
| 15 | 37.1 | 32.8 | 11.3 | 30.6 | 8.2 | 27.0 |
| 16 | 104.0 | 21.3 | 26.3 | 25.3 | 2.8 | 50.2 |
| 17 | 93.2 | 19.9 | 15.3 | 16.4 | 2.4 | 61.0 |
| 18 | 99.7 | 17.6 | 27.1 | 27.4 | 2.6 | 52.2 |
| 19 | 97.3 | 20.7 | 27.1 | 27.9 | 2.7 | 48.5 |
| 20 | 108.4 | 21.9 | 14.0 | 12.9 | 3.4 | 61.5 |
| 21 | 42.2 | 34.8 | 12.1 | 28.7 | 7.9 | 26.8 |
| 22 | 101.9 | 21.5 | 27.8 | 27.3 | 2.6 | 48.3 |
| 23 | 106.5 | 22.4 | 23.8 | 22.3 | 3.3 | 51.9 |
| 24 | 120.8 | 20.7 | 28.3 | 23.4 | 3.1 | 52.6 |
| 25 | 57.3 | 53.2 | 6.8 | 11.9 | 4.7 | 28.6 |
| 26 | 103.5 | 19.8 | 19.2 | 18.5 | 2.8 | 58.8 |
| 27 | 104.0 | 30.7 | 14.1 | 13.6 | 4.0 | 49.6 |
| 28 | 105.3 | 18.95 | 27.3 | 25.96 | 3.26 | 51.74 |
| 29 | 103.8 | 22.65 | 26.1 | 25.14 | 3.13 | 48.92 |
| 30 | 118.0 | 30.15 | 25.1 | 21.28 | 4.73 | 43.71 |
| 31 | 83.0 | 29.9 | 26.0 | 31.3 | 5.4 | 32.3 |
| 32 | 97.5 | 23.8 | 22.7 | 23.3 | 4.1 | 48.5 |
| 33 | 110.0 | 24.8 | 29.7 | 27.0 | 3.0 | 45.1 |
| 34 | 65.4 | 9.48 | 31.4 | 47.97 | 3.70 | 38.58 |
| 35 | 108.8 | 20.30 | 33.8 | 31.05 | 2.76 | 45.66 |
| 36 | 63.6 | 31.6 | 20.6 | 32.4 | 5.6 | 29.0 |
| 37 | 110.7 | 21.9 | 26.0 | 23.5 | 3.0 | 51.4 |
| 38 | 86.0 | 25.6 | 30.2 | 35.1 | 4.5 | 34.1 |
| 39 | 110.7 | 22.0 | 36.8 | 33.2 | 3.1 | 41.4 |
| 40 | 101.0 | 19.0 | 30.3 | 30.0 | 2.9 | 47.9 |
| 41 | 130.0 | 19.4 | 48.2 | 37.1 | 3.2 | 40.0 |

In addition to the methylchlorodisilanes employed above, I may use other organohalogenopolysilanes, e. g., organohalogenodisilanes corresponding to the above-identified general formula $$Si_2X_n(R)_{6-n}$$

where R is another monovalent organic radical, for example, an alkyl radical (for instance, ethyl, propyl, butyl, isobutyl, amyl, decyl, etc.); aryl radical (for instance, phenyl, naphthyl, anthracyl, etc.); alkaryl radical (for instance, tolyl, xylyl, ethylphenyl, etc.); aralkyl radical (for instance, benzyl, phenylethyl, etc.); other saturated and unsaturated aliphatic and cycloaliphatic radicals, for instance, vinyl, allyl, butadienyl, propinyl, cyclohexanyl, cyclopentenyl, etc., radicals; and $n$ has the meaning given above. The organic radicals mentioned above which are present in the organohalogenodisilane may have attached to them other modifying groups, for example, halogens (e. g., 1 to 5 chlorine atoms on the phenyl nucleus), nitro radicals, etc., which are essentially inert under the conditions at which the present invention is carried out.

Obviously, in addition to the organohalogenodisilanes, other organohalogenopolysilanes containing more than two silicon atoms attached directly to each other, may be employed without departing from the scope of the invention. The type of organic amine compound employed may be varied widely and one may employ other organic amine compounds (or mixtures of the latter) in addition to those recited in the foregoing examples. The ratio of reactants may be varied widely as has been described above. In general, the concentration of the organic amine compound may be varied within wide ranges and on a weight basis is advantageously of the order from about 0.05 to 25%, by weight, or more, based on the weight of the mixture of organohalogenopolysilanes or any individual organohalogenopolysilane which may be employed for the purpose. The rate of introduction of the hydrogen halide is not critical and may obviously be varied within wide limits, consistent with the ability to handle the product vapors, and the prevention of undue loss of unreacted hydrogen halide with the vent gases.

The temperature of reaction can also be varied widely as is apparent from the foregoing examples and is advantageously within the range of from about 90° to 200° C. Higher temperatures, of course, may be used, and under some conditions of reaction may be as high as 400° C.

In choosing the organic compound amine, it is generally desirable, for maximum ease of operation, to employ those which have high boiling points of the order of about 150° to 250° C.; however, the use of lower boiling organic tertiary compounds is not precluded, especially when using superatmospheric pressures. The use of solvents may be of some advantage under certain conditions. In addition to the xylene employed in the foregoing examples, one may also use benzene, toluene, chlorobenzene, etc.

It will also be understood by those skilled in the art that pressures other than atmospheric pressure, for example, superatmospheric and subatmospheric pressure, may also be employed without departing from the scope of the invention. When employing superatmospheric pressure in a batch operation, the time of contact between the organohalogenopolysilane, the tertiary organic compound, and the hydrogen halide should be as low as possible consistent with the desired yields in order to prevent the formation of undesirable by-products.

Although primary and secondary organic amines may be of limited use under certain conditions, the use of such types of amines is not desirable nor equivalent for the reason that one obtains silazines (from the reaction of the organohalogenomonosilane and the primary or secondary amine) which are polymeric materials similar to the siloxane linkages but instead of oxygen between silicon atoms, one has a nitrogen atom. Obviously, such polymeric products are disadvantageous because it would reduce the yield of the more desirable organohalogenomonosilanes.

The organohalogenomonosilanes obtained in accordance with my process from the organohalogenopolysilanes may be employed for various purposes. Thus, the former may be used in making organopolysiloxane resins of the type more particularly disclosed and claimed in Rochow Patents 2,258,218–222. In addition, these organohalogenomonosilanes can be used to make useful lubricating organopolysiloxane oils (as is more particularly disclosed in Patnode Patents 2,469,888 and 2,469,890), or organopolysiloxane gums and vulcanized, filled products therefrom. The organohalogenomonosilanes containing silicon-bonded hydrogen, for instance, methyldichlorosilane, have found extensive use in the water-repellent field; thus, methyldichlorosilane is hydrolyzed to give a methyl hydrogen polysiloxane which can be mixed with suitable curing agents, applied to textiles, and dried, for instance, by heating, to give surfaces which are water repellent, and which maintain their water repellency even though washed or dry cleaned numerous times.

What I claim as new and desire to secure by Letters Patent of the United States is:

1. The process for obtaining organohalogenomonosilanes from organohalogenopolysilanes in which the organic groups are monovalent hydrocarbon radicals attached directly to silicon by carbon-silicon linkages, which comprises treating the latter with a hydrogen halide in the presence of an organic amine compound selected from the class consisting of (1) heterocyclic tertiary organic amines, (2) tertiary organic amines having the formula $R_3N$, where R is a member selected from the class consisting of aryl and alkyl groups, and (3) salts of the tertiary amines of (1) and (2).

2. The process for obtaining methylchloromonosilanes from methylchloropolysilanes which comprises heating the latter with hydrogen chloride in the presence of an organic amine compound selected from the class consisting of (1) heterocyclic tertiary organic amines, (2) tertiary organic amines of the formula $R_3N$, where R is a member selected from the class consisting of aryl and alkyl groups, and (3) salts of the tertiary amines of (1) and (2).

3. The process for obtaining methylchloromonosilanes from methylchloropolysilanes which comprises heating the latter with hydrogen chloride in the presence of a salt of an organic tertiary amine having the formula $R_3N$, where R is a member selected from the class consisting of aryl and alkyl radicals, and a hydrogen halide.

4. The process as in claim 2 in which the organic amine compound is an alkyl tertiary amine.

5. The process as in claim 2 in which the organic amine compound is tri-(n-butyl) amine.

6. The process as in claim 2 in which the organic amine compound is quinoline.

7. The process as in claim 2 in which the organic amine compound is N,N-dimethyl aniline.

8. The process as in claim 2 in which the organic amine compound is lauryl dimethyl amine.

9. The process as in claim 2 in which the organic amine compound is N,N-dimethyl benzyl amine.

10. The process for obtaining methylchloromonosilanes from a mixture comprising predominantly methylchlorodisilanes, which process comprises heating the latter in the presence of an alkyl tertiary amine while simultaneously passing hydrogen chloride into the reaction mixture and concurrently removing formed methylchloromonosilanes, the said alkyl tertiary amine being present, by weight, in an amount equal to at least 0.1% of the weight of the methylchlorodisilane mixture and there being employed at least 0.25 mol of the hydrogen chloride per mole of the methylchlorodisilane mixture.

11. The process as in claim 10 in which the tertiary alkyl amine is tri-(n-butyl) amine.

References Cited in the file of this patent

UNITED STATES PATENTS 2,681,355     Barry     June 15, 1954